United States Patent
Zhan

(10) Patent No.: US 11,858,736 B2
(45) Date of Patent: Jan. 2, 2024

(54) CARRYING DEVICE AND TRANSPORT ROBOT HAVING THE SAME

(71) Applicant: HAI ROBOTICS CO., LTD., Guangdong (CN)

(72) Inventor: Qingxin Zhan, Guangdong (CN)

(73) Assignee: HAI ROBOTICS CO., LTD., Guangdong (CN)

(*) Notice: Subject to any disclaimer, the term of this patent is extended or adjusted under 35 U.S.C. 154(b) by 0 days.

(21) Appl. No.: 17/663,887

(22) Filed: May 18, 2022

(65) Prior Publication Data

US 2022/0274775 A1 Sep. 1, 2022

Related U.S. Application Data

(63) Continuation of application No. PCT/CN2020/130158, filed on Nov. 19, 2020.

(30) Foreign Application Priority Data

Nov. 19, 2019 (CN) .......................... 201922018221.2

(51) Int. Cl.
*B65G 1/04* (2006.01)

(52) U.S. Cl.
CPC .... *B65G 1/0435* (2013.01); *B65G 2203/0258* (2013.01); *B65G 2203/041* (2013.01)

(58) Field of Classification Search
CPC ................ B65G 1/0492; B65G 1/0435; B65G 2203/041; B65G 2203/0258; B66F 9/122
See application file for complete search history.

(56) References Cited

U.S. PATENT DOCUMENTS

| | | | | |
|---|---|---|---|---|
| 9,120,622 B1* | 9/2015 | Elazary | ................. | B25J 9/1697 |
| 11,104,514 B2* | 8/2021 | Cheng | ....................... | B66F 9/08 |
| 11,130,242 B1* | 9/2021 | Kalm | ................... | B25J 15/0033 |
| 11,548,770 B2* | 1/2023 | Zhan | ...................... | B66F 9/195 |
| 2019/0276235 A1* | 9/2019 | Gines | ................... | B65G 1/1376 |
| 2020/0078936 A1* | 3/2020 | Wu | .......................... | B25J 9/162 |
| 2021/0187760 A1* | 6/2021 | Kong | ...................... | B25J 5/007 |
| 2021/0323767 A1* | 10/2021 | Liu | ......................... | B66F 9/063 |
| 2021/0354920 A1* | 11/2021 | Zhan | ...................... | B25J 9/023 |
| 2021/0354964 A1* | 11/2021 | Nobata | .................... | B66F 9/14 |
| 2021/0395014 A1* | 12/2021 | Chen | ...................... | B25J 9/1664 |
| 2022/0135323 A1* | 5/2022 | Kimura | ................ | B65G 1/0435 |
| | | | | 414/266 |

(Continued)

FOREIGN PATENT DOCUMENTS

| | | |
|---|---|---|
| CN | 106927179 A | 7/2017 |
| CN | 108217038 A | 6/2018 |

(Continued)

*Primary Examiner* — Kaitlin S Joerger

(57) ABSTRACT

This application relates to the field of intelligent warehousing, and discloses a carrying device and a transport robot having the carrying device. The carrying device includes: a bracket; a tray, mounted on the bracket, and configured to hold goods; a detection device, connected to the tray, and configured to detect the goods placed on the tray; and a telescopic arm, mounted on the bracket, and extensible in a direction parallel to the tray, to move the goods placed on the tray. In the carrying device, the detection device is mounted on the tray, and the detection device detects the goods placed on the tray, avoiding the manual detection of the goods, and providing higher efficiency.

15 Claims, 15 Drawing Sheets

(56) References Cited

U.S. PATENT DOCUMENTS

| | | | |
|---|---|---|---|
| 2022/0169445 A1* | 6/2022 | Cheng | B66F 9/063 |
| 2022/0169446 A1* | 6/2022 | Cheng | G06Q 10/08 |
| 2022/0185583 A1* | 6/2022 | Kong | B65G 1/0435 |
| 2022/0242664 A1* | 8/2022 | Rivoir | B66F 9/141 |
| 2022/0258974 A1* | 8/2022 | Iwamoto | B66F 9/0755 |
| 2022/0363527 A1* | 11/2022 | Iwata | B65G 1/1375 |

FOREIGN PATENT DOCUMENTS

| | | |
|---|---|---|
| CN | 209023571 U | 6/2019 |
| CN | 209160601 U | 7/2019 |
| EP | 3339238 A1 | 6/2018 |
| WO | 2019095804 A1 | 5/2019 |

* cited by examiner

CARRYING DEVICE AND TRANSPORT ROBOT HAVING THE SAME

CROSS-REFERENCE TO RELATED APPLICATIONS

This application is a continuation under 35 U.S.C. § 120 of international patent Application No. PCT/CN2020/130158, filed on Nov. 19, 2020, which claims priority to Chinese Utility Model Patent Application No. 201922018221.2, filed on Nov. 19, 2019, both of which are incorporated herein by reference in their entireties.

TECHNICAL FIELD

This application relates to the field of intelligent warehousing, and in particular, to a carrying device and a transport robot having the carrying device.

BACKGROUND

Intelligent warehousing is a step in the logistics process. The application of intelligent warehousing ensures the speed and accuracy of data input in all steps of warehouse management of goods, so as to ensure that enterprises can grasp the real data of the inventory in time and accurately, and properly maintain and control the enterprise inventory. By means of scientific coding, batches and shelf life of inventory goods can also be conveniently managed. By using the storage location management function of the SNHGES system, current locations of all inventory goods can be grasped in time, which is conducive to improving the efficiency of warehouse management.

A transport robot plays an important role in the intelligent warehousing. The transport robot carries goods through a carrying device. However, when carrying goods at one time, the carrying device cannot detect the weight of the goods being carried. Subsequently, the staff need to detect the goods, so as to take inventory of the goods, which is inefficient.

SUMMARY

To resolve the foregoing technical problems, embodiments of this application provide a carrying device and a transport robot having the carrying device. The carrying device can detect goods carried by the carrying device at one time.

To resolve the foregoing technical problems, the embodiments of this application provide the following technical solutions:

According to one aspect, a carrying device is provided, including: a bracket; a tray, mounted on the bracket, and configured to hold goods; a detection device, connected to the tray, and configured to detect the goods placed on the tray; and a telescopic arm, mounted on the bracket, and extensible in a direction parallel to the tray, to move the goods placed on the tray.

In some embodiments, the tray is mounted on the telescopic arm; and when the telescopic arm extends, the tray extends with the telescopic arm.

In some embodiments, the carrying device further includes a fork and a rotary mechanism; the fork includes the tray, the detection device and the telescopic arm; and the fork is mounted on the bracket, and the rotary mechanism is configured to drive the fork to rotate around an axis perpendicular to the tray.

In some embodiments, the carrying device further includes a fork and a moving mechanism; the fork includes the bracket, the detection device, and the telescopic arm; and the fork is mounted on the bracket, the moving mechanism is configured to drive the fork to move in the direction parallel to the tray, and a moving direction of the fork is perpendicular to an extending direction of the telescopic arm.

In some embodiments, the carrying device further includes an image detection device; and the image detection device is configured to obtain image information of the goods.

In some embodiments, the bracket includes an upper surface and a lower surface opposite to each other; and the upper surface of the bracket is configured to hold the goods, and the image detection device is mounted on the lower surface of the bracket.

In some embodiments, the detection device is a weight detection device configured to detect weight of the goods placed on the tray.

In some embodiments, the detection device is sheet-like and parallel to the tray.

In some embodiments, the detection device is arranged on a side of the tray for holding the goods.

In some embodiments, the detection device is a radio frequency identification device configured to detect radio frequency identification tags on the goods placed on the tray, to detect the goods placed on the tray.

According to another aspect, a transport robot is provided, including the carrying device described above.

In some embodiments, the transport robot further includes a lifting mechanism configured to drive the carrying device to be raised and lowered.

In some embodiments, the transport robot further includes a multi-layer rack, where any layer of the multi-layer rack is configured to hold the goods.

Compared with the prior art, according to the carrying device and the transport robot having the carrying device in the embodiments of this application, in the carrying device, the detection device is mounted on the tray, and the detection device detects the goods placed on the tray, avoiding the manual detection of the goods, and providing higher efficiency.

BRIEF DESCRIPTION OF THE DRAWINGS

One or more embodiments are described by way of example with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding this application, this application is described in further detail below with reference to the accompanying drawings and specific implementations. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inside", "outside", and similar expressions used in this specification are merely used for an illustrative purpose.

Unless otherwise defined, all technical and scientific terms used herein have the same meaning as commonly understood by a person skilled in the art to which this application belongs. The terms used in the specification of this application are merely used for describing specific implementations, and are not intended to limit this application. A term "and/or" used in this specification includes any or all combinations of one or more related listed items.

Embodiment 1

Figure 1:
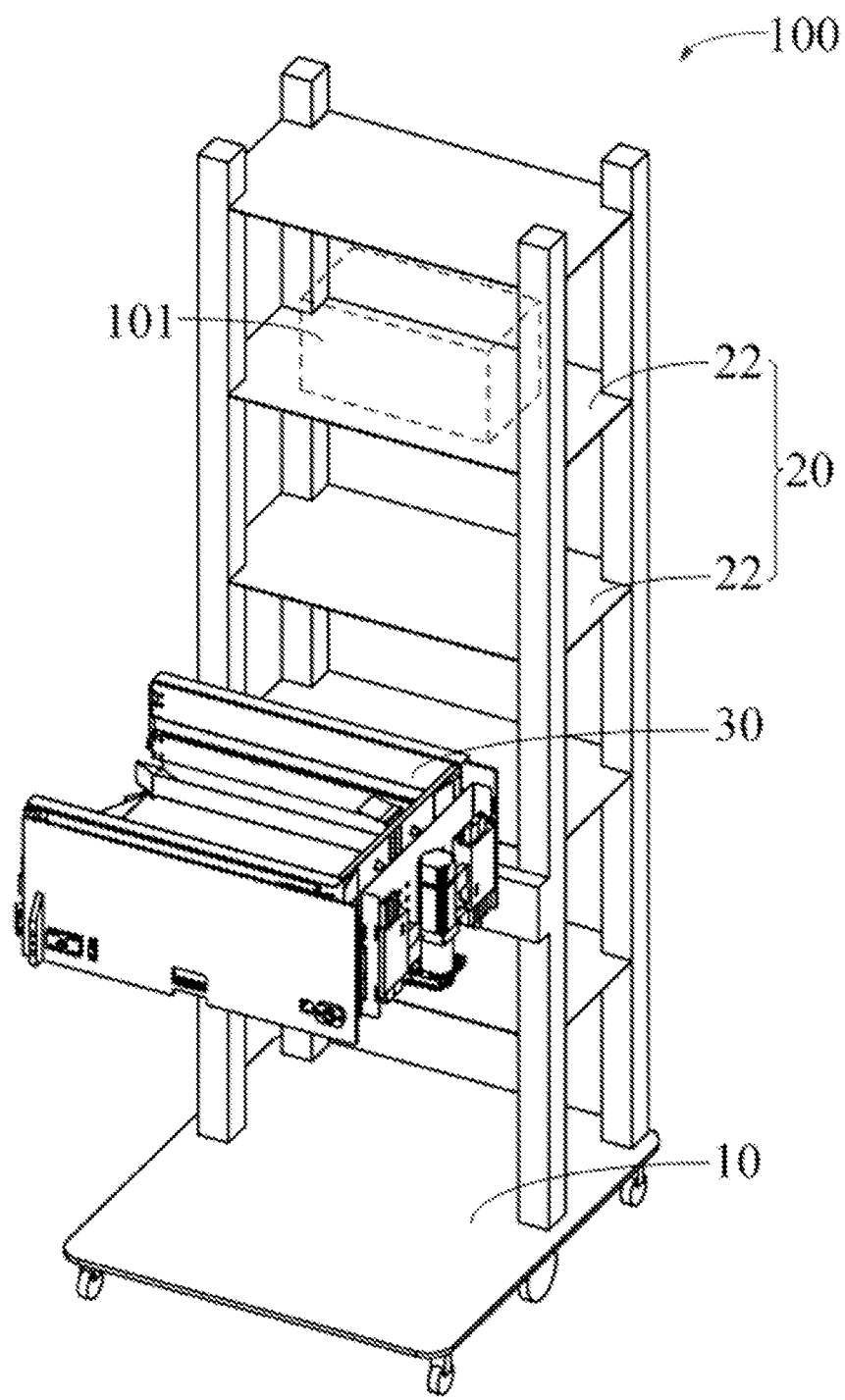
FIG. 1 is a three-dimensional view of a transport robot according to Embodiment 1 of this application, where a multi-layer rack of the transport robot is placed with goods.

Referring to FIG. 1, a transport robot 100 provided in an embodiment of this application is configured to transport goods 101 on a warehouse shelving unit (not shown in the figure). The warehouse shelving unit may be single-layer or multi-layer, and any layer of the warehouse shelving unit is configured to hold the goods 101. There may be one or more warehouse shelving units. The transport robot 100 includes a chassis 10, a multi-layer rack 20, a lifting mechanism (not shown in the figure), and a carrying device 30. The chassis 10 carries the multi-layer rack 20, the lifting mechanism, and the carrying device 30. The chassis 10 is movable, and is configured to drive the carried multi-layer rack 20, lifting mechanism, and carrying device 30 to move together. By mounting the movable chassis 10, the transport robot 100 can transport the goods 101 among a plurality of warehouse shelving units. Any layer of the multi-layer rack 20 is configured to hold the goods 101. Specifically, the multi-layer rack 20 includes a plurality of partitions 22, the plurality of partitions 22 divide the multi-layer rack 20 into a plurality layers, and any one of the plurality of partitions 22 is configured to hold the goods 101. The lifting mechanism is configured to drive the carrying device 30 to be raised and lowered. The lifting mechanism is powered by a motor, and the power is transmitted through a sprocket mechanism. According to actual situations, the sprocket mechanism may alternatively be replaced with a transmission mechanism such as a screw mechanism and a pulley mechanism. In addition, the sprocket mechanism may be omitted and the lifting mechanism is directly driven by the motor. In this case, the motor is a linear motor. The carrying device 30 is configured to carry the goods 101 between the multi-layer rack 20 and the warehouse shelving unit. The carrying device 30 is driven to be raised and lowered by the lifting mechanism, so that the carrying device 30 can carry the goods 101 on any layer of the multi-layer rack 20 or any layer of the warehouse shelving unit. It can be understood that, the carrying device 30 is not limited to be applied to the transport robot 100. For example, the carrying device 30 may alternatively be applied to fields such as shuttle buses and sorting platforms.

Figure 2:
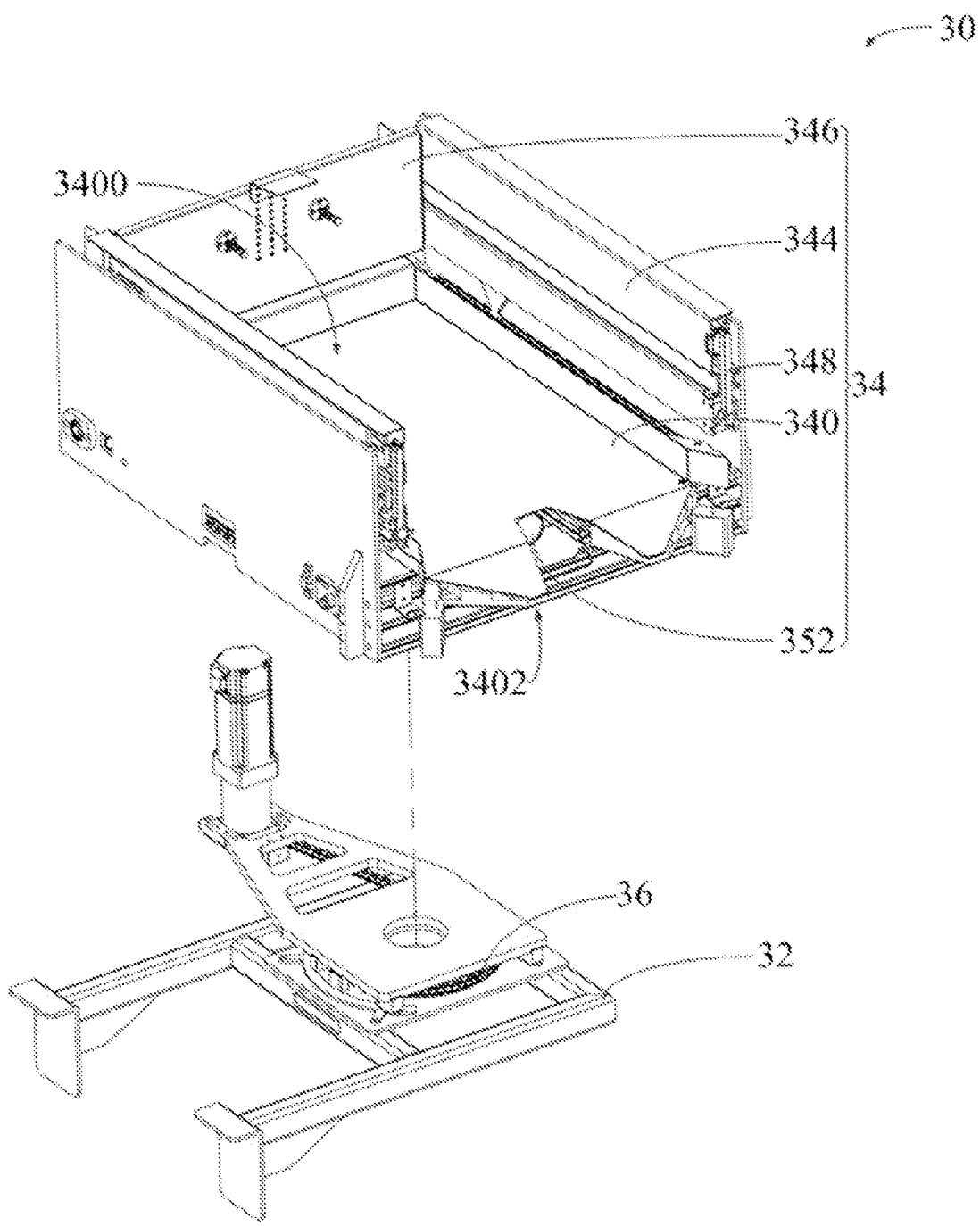
FIG. 2 is a schematic exploded view of a carrying device of the transport robot shown in FIG. 1.
Figure 3:
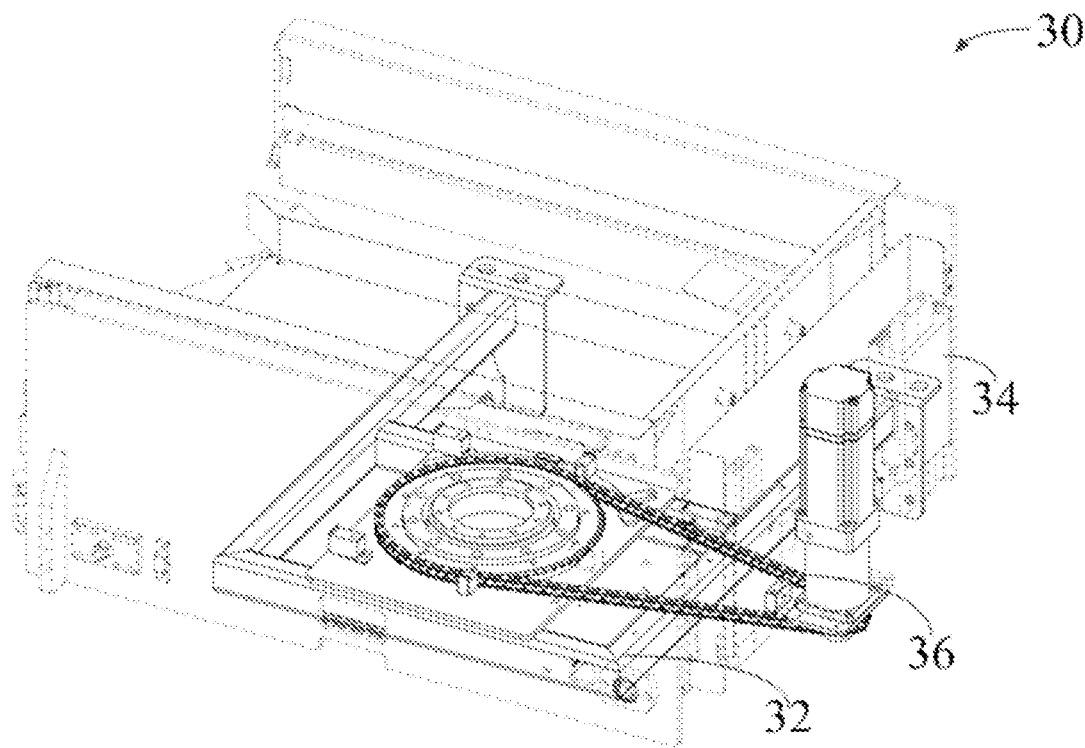
FIG. 3 is a perspective view of the carrying device shown in FIG. 2, where a fork of the carrying device is made transparent, so that a rotary mechanism is shown.

Referring to FIG. 2 and FIG. 3, the carrying device 30 includes a bracket 32, a fork 34, and a rotary mechanism 36. The bracket 32 may be formed by welding a molding material and a board material, and is configured to support the fork 34 and the rotary mechanism 36. The fork 34 is mounted on the bracket 32, and the rotary mechanism 36 is configured to drive the fork 34 to rotate around a vertical axis relative to the bracket 32. As shown in FIG. 3, the rotary mechanism 36 is powered by a motor, and the power is transmitted through a sprocket mechanism. It can be understood that the sprocket mechanism may alternatively be replaced with a pulley mechanism, a rack and pinion mechanism, a screw mechanism, or the like. In addition, the sprocket mechanism may be omitted and the rotary mechanism 36 is directly driven by the motor. The fork 34 is configured to carry the goods 101 between the multi-layer rack 20 and the warehouse shelving unit after being aligned with the multi-layer rack 20 or the warehouse shelving unit. If the fork 34 is not aligned with the multi-layer rack 20, the fork 34 may be rotated relative to the bracket 32, to ensure that the fork 34 is aligned with the multi-layer rack 20. It can be understood that, according to actual situations, the fork 34 may be fixedly mounted on the bracket 32, and correspondingly, the rotary mechanism 36 may also be omitted. For example, the transport robot 100 is fixed on the ground, or the transport robot 100 has a fixed track. In this case, the fork 34 can always be aligned with the multi-layer rack. Obviously, the fork 34 does not need to be rotated. In another example, the chassis 10 has a steering function. Through the steering of the chassis 10, the rotary mechanism 36 is replaced, which can also ensure that the fork 34 is aligned with the multi-layer rack 20.

Referring to FIG. 2 to FIG. 5, the fork 34 includes a tray 340, a detection device 342, a telescopic arm assembly, and an image detection device 352. The tray 340 is configured to hold the goods 101 and is a flat plate arranged horizontally. The tray 340 includes an upper surface 3400 and a lower surface 3402 opposite to each other. The upper surface 3400 is configured to hold the goods 101. The detection device 342 is configured to detect the goods 101 placed on the tray 340, and is mounted on the lower surface 3402 of the tray 340.

In some other embodiments, the detection device 342 may be a radio frequency identification device, which uses, for example, the radio frequency identification (RFID) technology. Then, the radio frequency identification device may be an RFID module configured to detect radio frequency identification tags, that is, RFID tags on the goods placed on the tray 340, so as to detect the goods placed on the tray 340.

Figure 4:
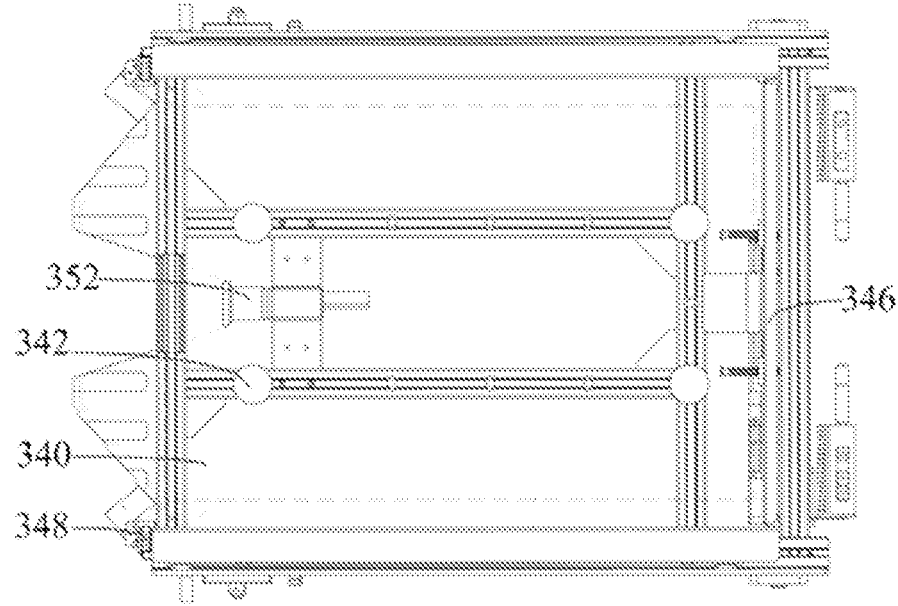
FIG. 4 is a top view of a fork of the carrying device shown in FIG. 2, where a tray of the fork is made transparent, so that a detection device of the fork is shown.
Figure 5:
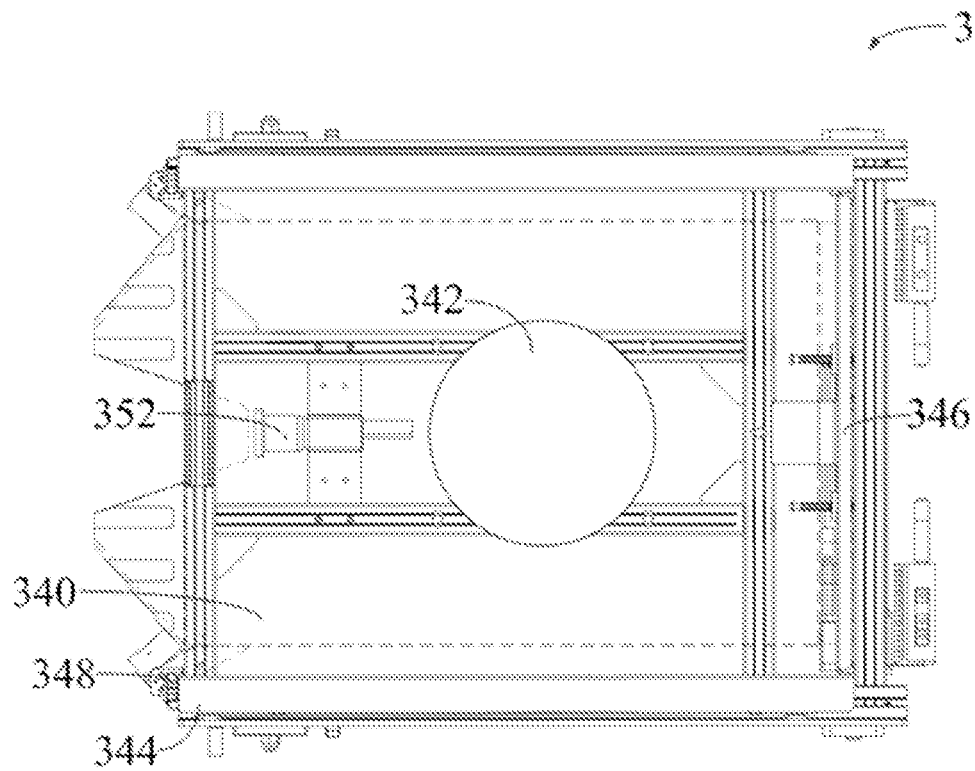
FIG. 5 is a top view of a fork of the carrying device in another implementation shown in FIG. 2, where a tray of the fork is made transparent, so that a detection device is shown.

In this embodiment, the detection device 342 is a weight detection device, where the weight detection device may be a pressure sensor configured to detect weight information of the goods placed on the tray 340, and the detection device 342 is block-like. As shown in FIG. 4, a plurality of detection devices 342 are evenly distributed on a horizontal plane, that is, a plane parallel to the tray 340. For example, four detection devices 342 are distributed in a rectangular shape. By arranging the plurality of detection devices 342 evenly distributed, inaccurate detection caused by the goods 101 located offset on the tray 340 can be avoided. In some other embodiments, as shown in FIG. 5, the detection device 342 is located in a center of the tray 340, and in this case, there may be only one detection device 342.

Figure 6:
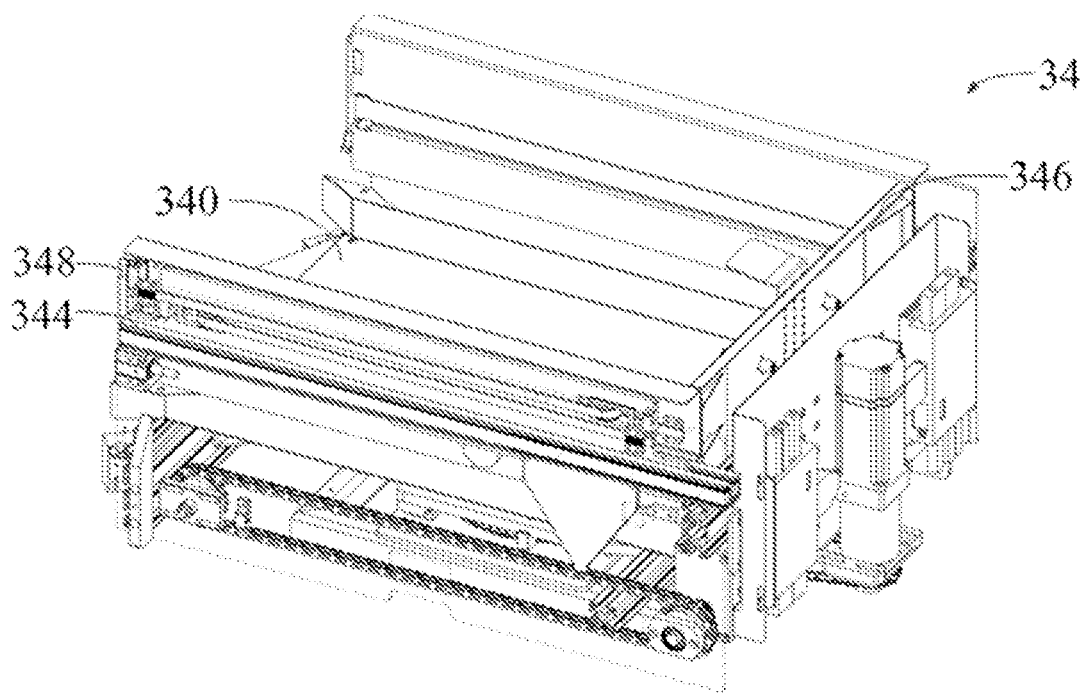
FIG. 6 is a three-dimensional view of a fork of the carrying device shown in FIG. 2, where a partial housing of the fork is made transparent, so that a driving mechanism of the fork is shown.

The telescopic arm assembly is configured to push the goods 101 placed on the tray 340 out of the tray 340 or pull the goods 101 to the tray 340. The telescopic arm assembly includes a telescopic arm 344, a fixed push rod 346, and a movable push rod 348. The telescopic arm 344 may extend horizontally, and in a direction perpendicular to an extending direction of the telescopic arm 344 and parallel to the tray 340, the telescopic arm 344 is located on one side of the tray 340. As shown in FIG. 6, the telescopic arm 344 is powered by a motor, and the power is transmitted through a sprocket mechanism. According to actual situations, the sprocket mechanism may be replaced with a transmission mechanism such as a pulley mechanism or a screw mechanism Both the fixed push rod 346 and the movable push rod 348 are mounted on the telescopic arm 344, and both the fixed push rod 346 and the movable push rod 348 are located on the same side of the telescopic arm 344 as the tray 340. When the telescopic arm 344 extends, the telescopic arm 344 drives the fixed push rod 346 and the movable push rod 348 to extend together. The movable push rod 348 is located in an extending direction of the fixed push rod 346 along the telescopic arm 344, and the movable push rod 348 may be received in the telescopic arm 344. The movable push rod 348 may be directly driven by a motor, and according to actual situations, the power can alternatively be transmitted through a transmission mechanism such as a gear set and a link mechanism.

Figure 7:
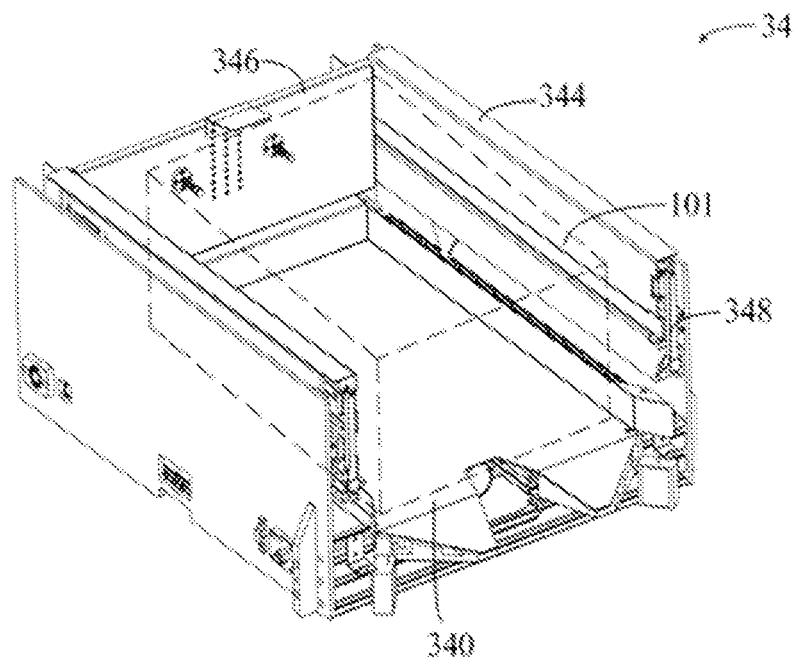
FIG. 7 is a three-dimensional view of a fork shown in FIG. 4, where a fixed push rod of the fork prepares to push goods out of a tray.
Figure 8:
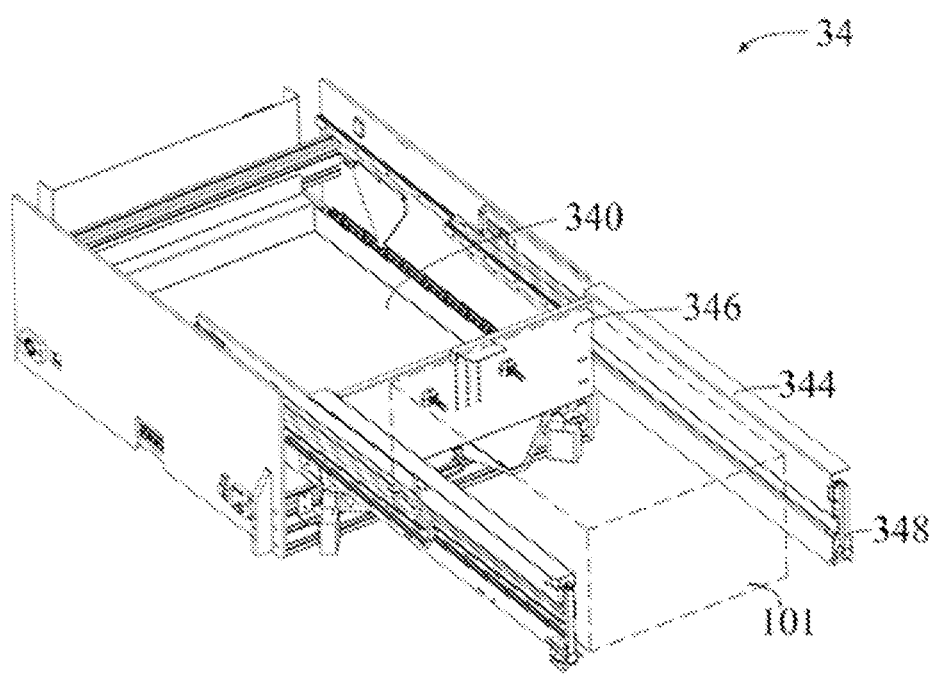
FIG. 8 is a three-dimensional view of the fork shown in FIG. 4, where a fixed push rod of the fork has pushed goods out of the tray, or a movable push rod of the fork is retracted and passes over goods, and prepares to pull the goods into the tray.

Referring to FIG. 7 to FIG. 10, the manner in which the fixed push rod 346 and the movable push rod 348 carry the goods 101 on the tray 340 is described herein as follows:

When the telescopic arm 344 extends, the fixed push rod 346 is configured to push the goods 101 out of the tray 340. Specifically, as shown in FIG. 7 and FIG. 8, the fixed push rod 346 extends with the telescopic arm 344 to push the goods 101 out of the tray 340. After the fixed push rod 346 pushes out the goods 101, the movable push rod 348 is received in the telescopic arm 344 and retracted with the telescopic arm 344.

Figure 9:
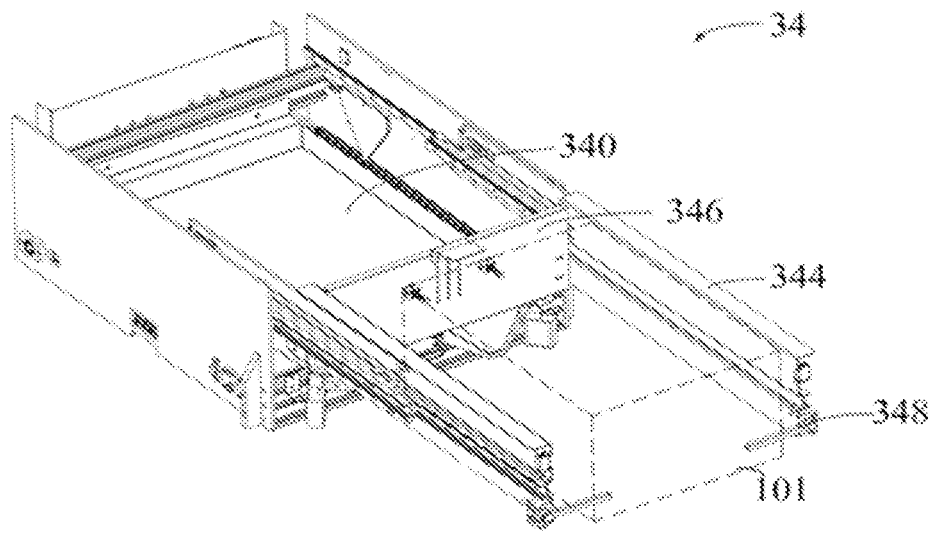
FIG. 9 is a three-dimensional view of the fork shown in FIG. 4, where a movable push rod of the fork passes over goods and is reset, and prepares to pull the goods into the tray.
Figure 10:
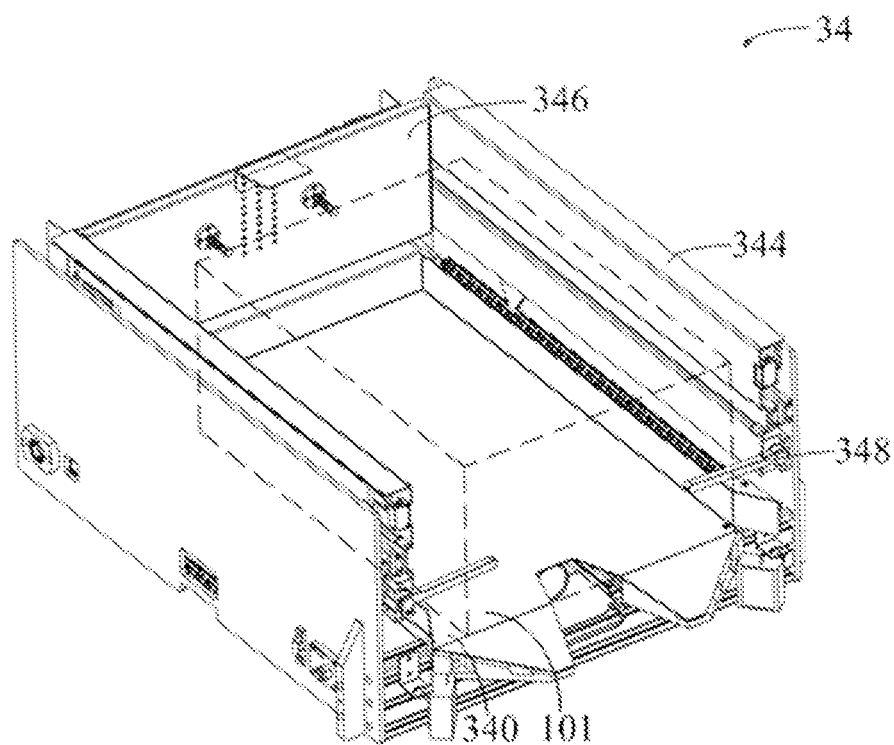
FIG. 10 is a three-dimensional view of the fork shown in FIG. 4, where a movable push rod of the fork has pulled goods into the tray.

When the telescopic arm 344 is retracted, the movable push rod 348 is configured to pull the goods 101 to the tray 340. Specifically, as shown in FIG. 8, the movable push rod 348 is received in the telescopic arm 344 and extends with the telescopic arm 344, so that the movable push rod 348 passes over the goods 101. As shown in FIG. 9 and FIG. 10, after the movable push rod 348 passes over the goods 101, the movable push rod 348 extends out of the telescopic arm 344 and is retracted with the telescopic arm 344, so that the movable push rod 348 pulls the goods 101 to the tray 340.

The manner in which the fork 34 carries the goods 101 on the multi-layer rack is further described herein as follows:

The fork 34 carries the goods 101 to the multi-layer rack 20. Specifically, the fixed push rod 346 extends with the telescopic arm 344, to push the goods 101 to the multi-layer rack 20, and then the movable push rod 348 is received in the telescopic arm 344 and retracted with the telescopic arm 344.

The fork 34 carries the goods 101 out of the multi-layer rack 20. Specifically, the movable push rod 348 is received in the telescopic arm 344 and extends with the telescopic arm 344, so that the movable push rod 348 passes over the goods 101. After the movable push rod 348 passes over the goods 101, the movable push rod 348 is reset and retracted with the telescopic arm 344, so that the movable push rod 348 pulls the goods 101 away from the multi-layer rack 20.

The manner in which the fork 34 carries the goods 101 on the warehouse shelving unit is similar to the manner in which the fork 34 carries the goods 101 on the multi-layer rack 20, and details are not described herein again.

The image detection device 352 is configured to obtain image information of the goods 101 or the warehouse shelving unit. The image detection device 352 may be a camera configured to scan an identification code attached to the goods 101 or the warehouse shelving unit, determine whether the carrying device 30 is at the same height as one layer of the goods to be carried on the warehouse shelving unit according to the identification code on the warehouse shelving unit, and determine whether the fork 34 is aligned with the warehouse shelving unit according to the identification code on the goods 101. The image detection device 352 is fixed relative to the tray 340, and to be precise, is mounted on the lower surface 3402 of the tray 340. It should be noted that, that the carrying device 30 is raised and lowered to be at the same height as one layer of the goods 101 to be carried on the multi-layer rack 20, or that the fork 34 is aligned with the multi-layer rack 20 are set through an initial program, which is more efficient. Certainly, a manner of scanning a QR code may alternatively be adopted. In addition, it should be noted that, the goods 101 may be a whole or a plurality of objects. When the goods 101 are a plurality of objects, the goods 101 should be placed in a storage box. Correspondingly, QR codes of the goods 101 are also attached to the outside of the storage box. It can be understood that, the motor may be replaced with a power device such as an air motor or a hydraulic system.

Embodiment 2

Figure 11:
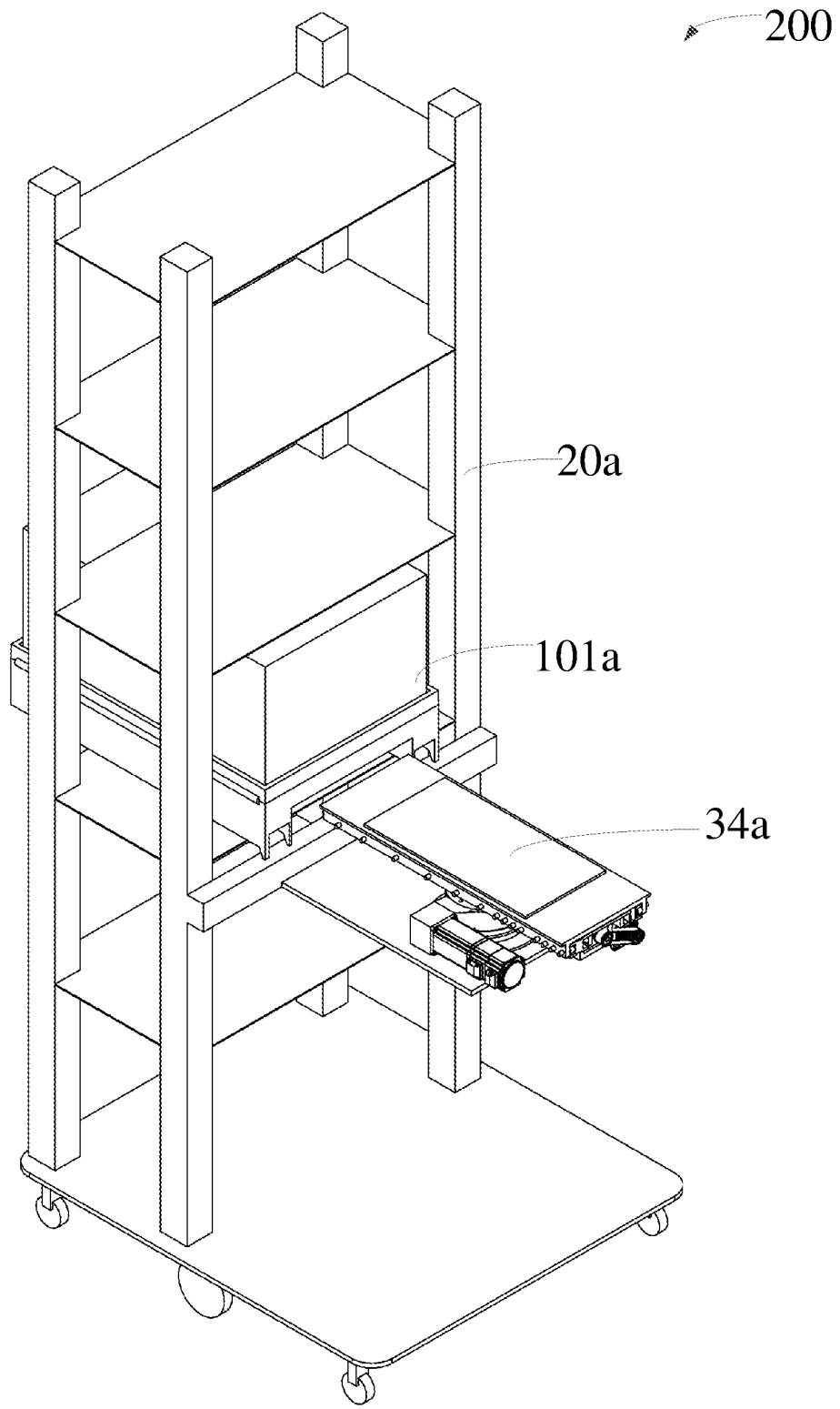
FIG. 11 is a three-dimensional view of a transport robot according to Embodiment 2 of this application, where a multi-layer rack of the transport robot is placed with goods.
Figure 12:
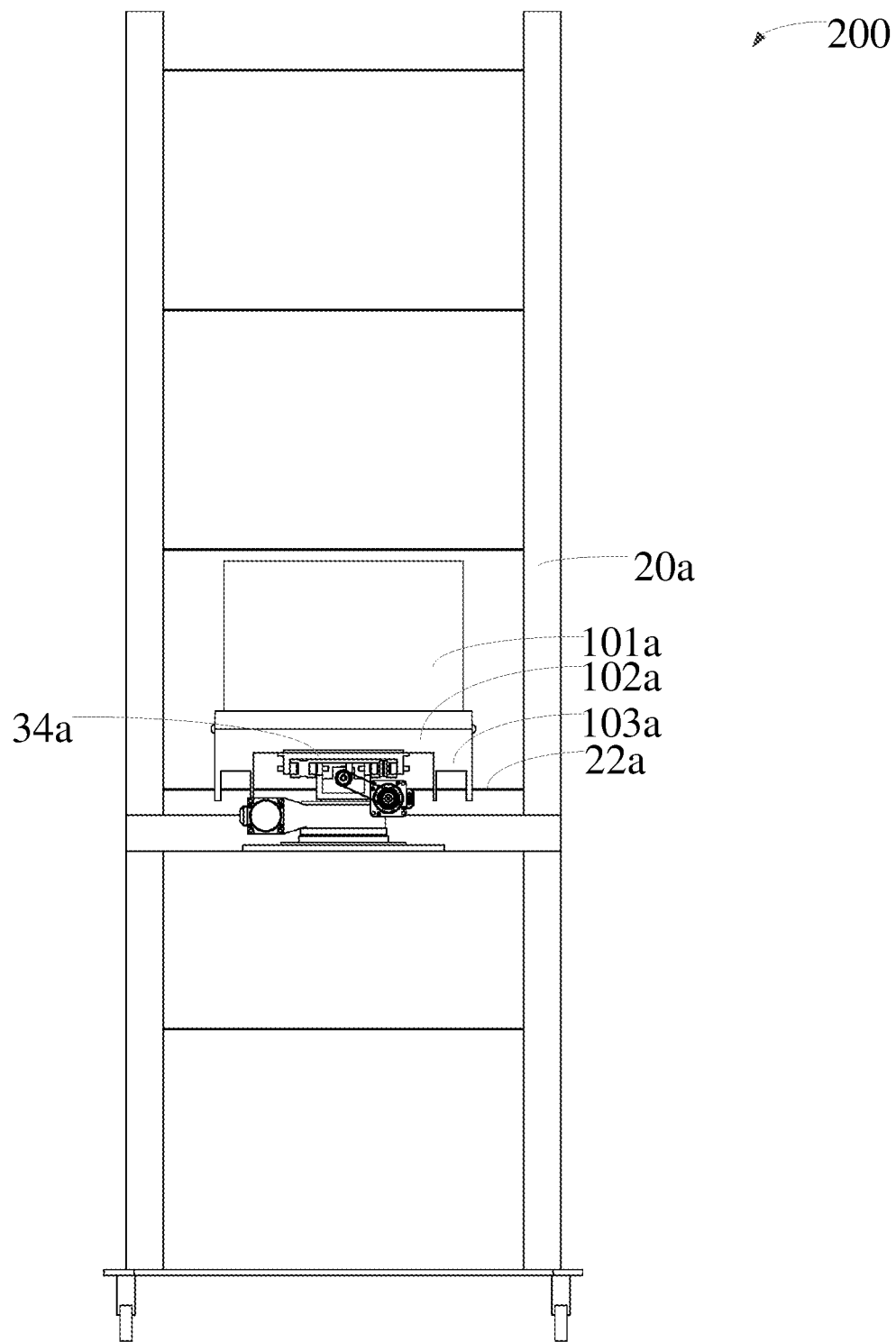
FIG. 12 is a front view of the transport robot shown in FIG. 11.

Referring to FIG. 11 and FIG. 12, Embodiment 2 of this application provides a transport robot 200, which is basically the same as the transport robot 100 of Embodiment 1, except that the structure of a fork 34a and the manner of carrying goods 101a are different.

Figure 13:
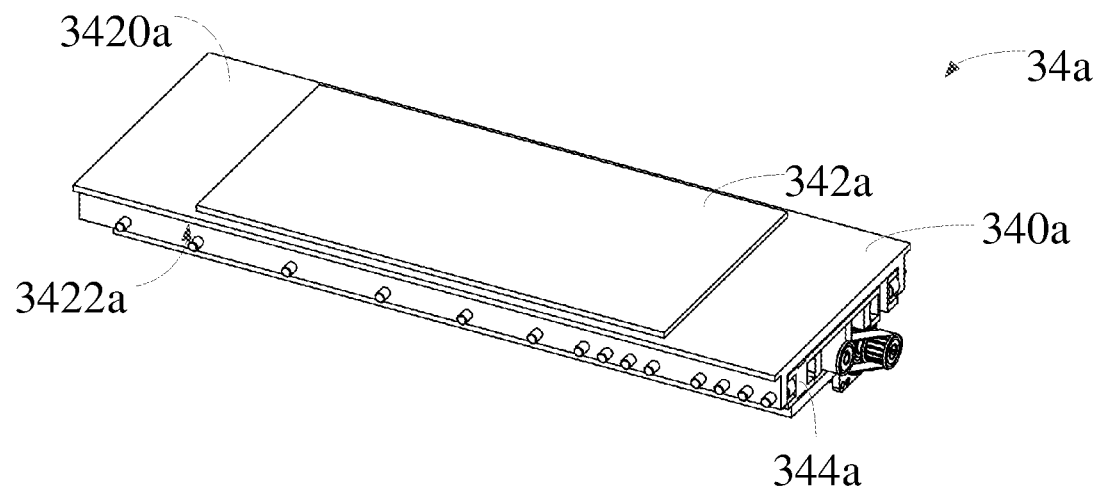
FIG. 13 is a three-dimensional view of a fork of the transport robot shown in FIG. 11, where a telescopic arm of the fork is retracted.
Figure 14:
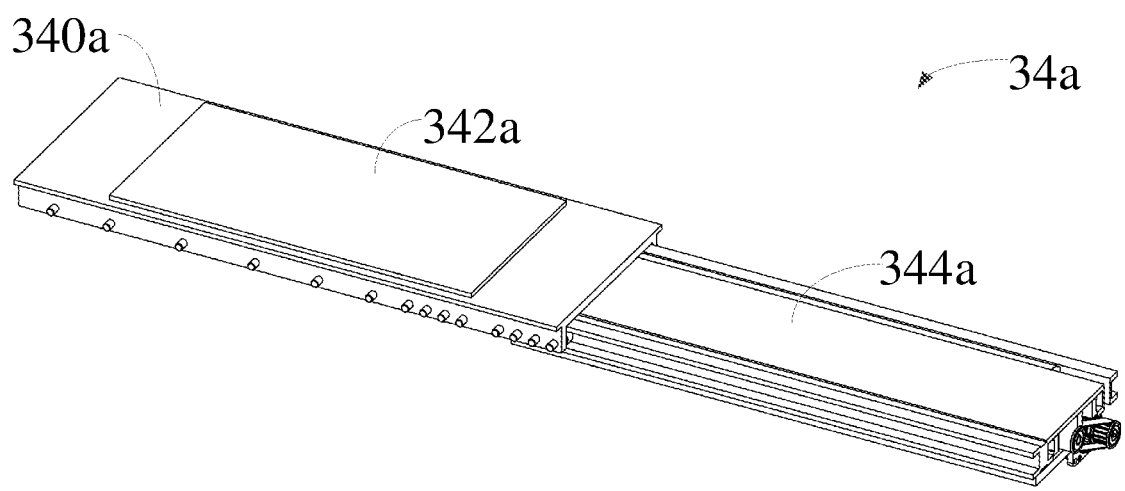
FIG. 14 is a three-dimensional view of a fork of the transport robot shown in FIG. 11, where a telescopic arm of the fork extends.

Referring to FIG. 13 and FIG. 14, the fork 34a includes a tray 340a, a detection device 342a, a telescopic arm 344a, and an image detection device (not shown in the figure).

The tray 340a is configured to hold the goods 101a, and is a flat plate arranged horizontally. The tray 340 includes an upper surface 3400a and a lower surface 3402a opposite to each other. The upper surface 3400a is configured to hold the goods 101a. The detection device 342a is configured to detect the goods 101a placed on the tray 340a, and is mounted on the upper surface 3400a of the tray 340a. The detection device 342a may be a weight detection device. When the weight detection device is a pressure sensor, the detection device 342a is sheet-like and parallel to the tray 340a. By laying the detection device 342a on the tray 340a, inaccurate detection caused by the goods 101a located offset on the tray 340a can be avoided. It can be understood that, according to actual situations, the detection device 342a may alternatively be located on the lower surface 3402a of the tray 340a. In addition, the detection device 342a in this embodiment is interchangeable with that of Embodiment 1. The lower surface 3402a of the tray 340a is mounted on the telescopic arm 344a.

As shown in FIG. 14, the telescopic arm 344a may extend horizontally, that is, in a direction parallel to the tray 340a. When the telescopic arm 344a extends, the telescopic arm 344a drives the tray 340a to extend together.

The manner in which the fork 34a carries the goods 101a on the multi-layer rack 20a is described herein. Referring to FIG. 17 to FIG. 21, the fork 34a cooperates with the lifting mechanism to carry the goods 101a on the multi-layer rack 20a as follows:

First, as shown in FIG. 12, a base plate 102a is provided, one side of the base plate 102a is configured to hold the goods 101a, and an opposite side is provided with two supporting points 103a. The base plate 102a may be placed on a partition 22a of the multi-layer rack 20a through the two supporting points 103a. In addition, when the base plate 102a is placed on the partition 22a, a distance between the two supporting points 103a can allow the tray 340a to extend, and a height of the base plate 102a supported by the two supporting points 103a can allow the tray 340a to be raised and lowered. Furthermore, due to the distance between the two supporting points 103a, the base plate 102a may be directly placed on the tray 340a. During the process of carrying the goods 101a, the base plate 102a is carried together with the goods 101a.

Figure 15:
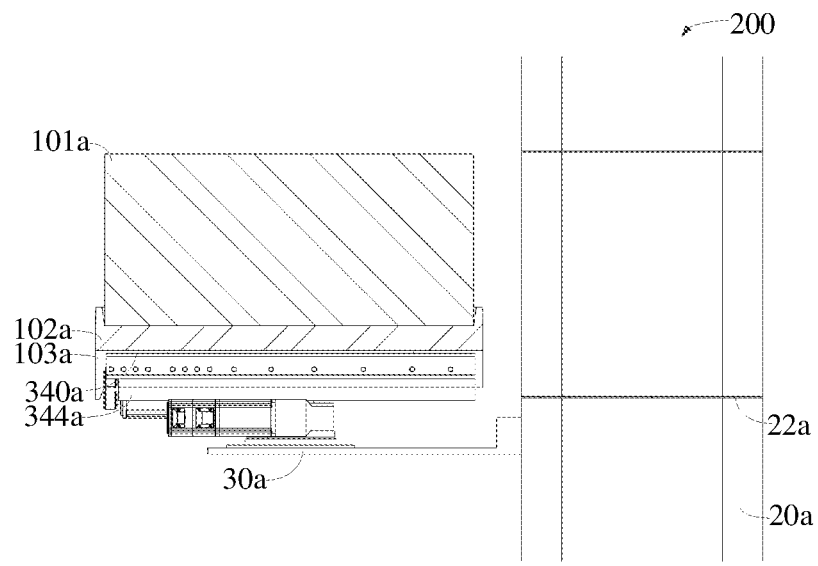
FIG. 15 is a side view of the transport robot shown in FIG. 11, where a partial structure of the transport robot is omitted, and in addition, a fork has carried goods out of the multi-layer rack, or prepares to carry goods to the multi-layer rack.
Figure 16:
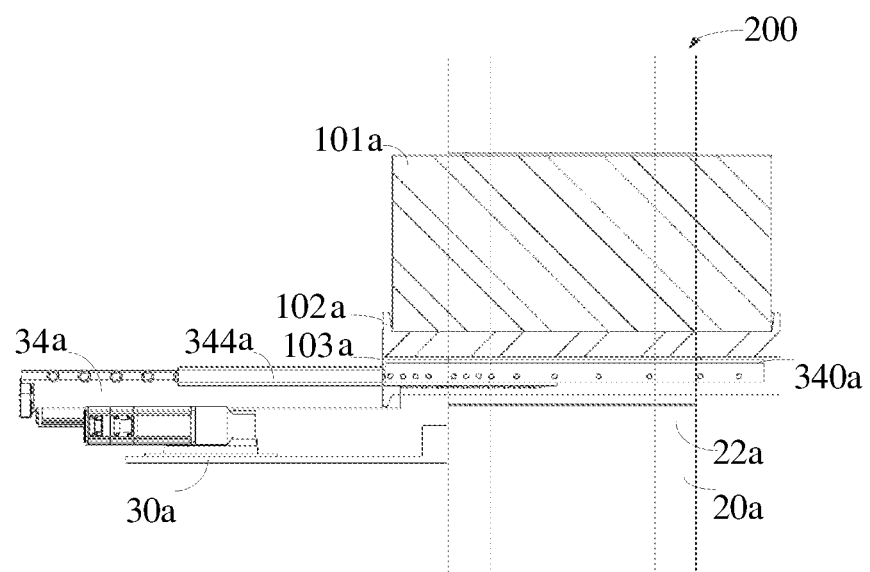
FIG. 16 is a side view of the transport robot shown in FIG. 11, where a partial structure is omitted, and in addition, a fork extends into the multi-layer rack, and goods are placed on the fork and separated from the multi-layer rack.
Figure 17:
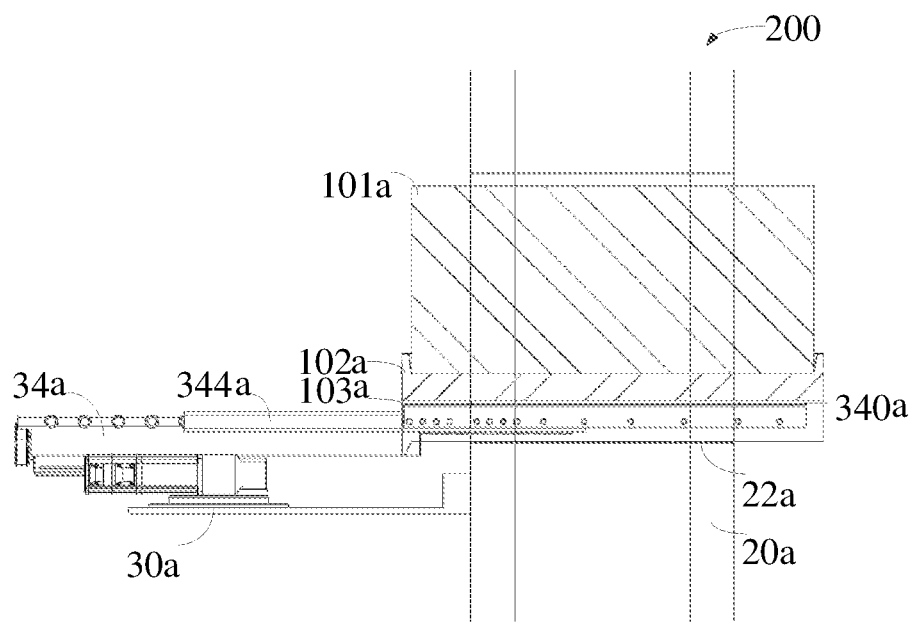
FIG. 17 is a side view of the transport robot shown in FIG. 11, where a partial structure is omitted, and in addition, a fork extends into the multi-layer rack, and goods are placed on both the fork and the multi-layer rack.
Figure 18:
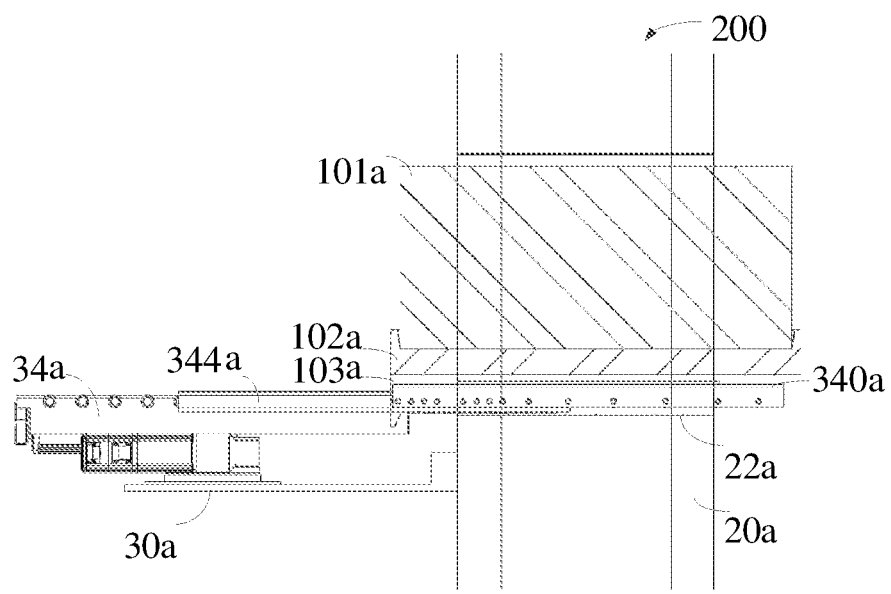
FIG. 18 is a side view of the transport robot shown in FIG. 11, where a partial structure is omitted, and in addition, a fork extends into the multi-layer rack, and goods are placed on the multi-layer rack and separated from the fork.
Figure 19:
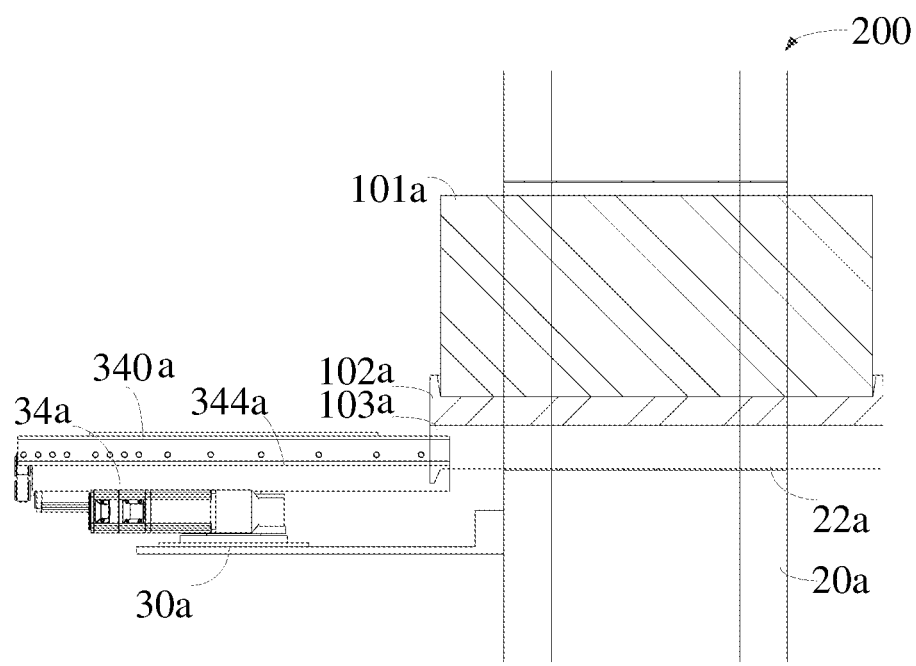
FIG. 19 is a side view of the transport robot shown in FIG. 11, where a partial structure is omitted, and in addition, a fork has carried goods to the multi-layer rack, or prepares to carry goods out of the multi-layer rack.

The fork 34a carries the goods 101a and the base plate 102a to the multi-layer rack 20a. Specifically, as shown in FIG. 15, the carrying device 30a is raised, so that the two supporting points 103a are higher than the partition 22a on which the goods 101a and the base plate 102a are to be placed. As shown in FIG. 16, then, the goods 101a, the base plate 102a, and the tray 340a extend with the telescopic arm 344a, so that the goods 101a, the base plate 102a, and the tray 340a are located right above the partition 22a. As shown in FIG. 17, then, the carrying device 30a is lowered, to bring the two supporting points 103a into contact with the partition 22a. As shown in FIG. 18, then, the carrying device 30a continues to be lowered, to separate the tray 340a from the base plate 102a. In this case, the goods 101a and the base plate 102a have been placed on the partition 22a. As shown in FIG. 19, then, the tray 340a is retracted with the telescopic arm 344a.

The fork 34a carries the goods 101a and the base plate 102a out of the multi-layer rack 20a. Specifically, as shown in FIG. 19, the carrying device 30a is lowered, so that the tray 340a is higher than the partition 22a on which the goods 101a are placed, but lower than the base plate 102a. As shown in FIG. 18, then, the tray 340a extends with the telescopic arm 344a, so that the tray 340a is located between the two supporting points 103a. As shown in FIG. 17, then, the carrying device 30a is raised, to bring the tray 340a into contact with the base plate 102a. As shown in FIG. 16, then, the carrying device 30a continues to be raised, to separate the two supporting points 103a from the partition 22a. In this case, the base plate 102a and the goods 101a are placed on the tray 340a. As shown in FIG. 15, then, the tray 340 is retracted with the telescopic arm 344a.

Furthermore, in some other embodiments, the two supporting points 103a are directly fixed on the partition 22a, and the goods 101a are placed on the partition 22a through the two supporting points.

The fork 34a carries the goods 101a and the base plate 102a to the multi-layer rack 20a. Specifically, the carrying device 30a is raised, so that the goods 101a are higher than the two supporting points 103a on which the goods 101a are to be placed. Then, the goods 101a and the tray 30a extend with the telescopic arm 344a, so that the goods and the tray 30a are located right above the two supporting points 103a. Then, the carrying device 30a is lowered, to bring the goods 101a into contact with the two supporting points 103a. Then, the carrying device 30a continues to be lowered, to separate the tray 340a from the goods 101a. In this case, the goods 101a have been placed on the two supporting points 103a. Then, the tray 30a is retracted with the telescopic arm 344a.

The fork 34a carries the goods 101a out of the multi-layer rack 20a. Specifically, the carrying device 30a is lowered, so that the tray 340a is higher than the partition 22a on which the goods 101a are placed, but lower than the goods 101a. Then, the tray 340a extends with the telescopic arm 344a, so that the tray 340a is located between the two supporting points 103a. Then, the carrying device 30a is raised, to bring the tray 340a into contact with the goods 101a. Then, the carrying device 30a continues to be raised, to separate the goods 101a from the two supporting points 103a. In this case, the goods 101a are placed on the tray 340a.

The image detection device is configured to obtain image information of the goods 101*a* or the warehouse shelving unit. The image detection device may be a camera configured to scan an identification code attached to the goods 101*a* or the warehouse shelving unit, then obtain information about the goods 101*a*, including a type, a shelf life and the like of the goods 101*a* according to information provided by the identification code of the goods 101*a*, or determine whether the carrying device 30*a* is at the same height as one layer of the goods 101*a* to be carried on the warehouse shelving unit according to the identification code on the warehouse shelving unit, and determine whether the fork 34*a* is aligned with the warehouse shelving unit according to the identification code on the goods 101*a*.

The image detection device is mounted on the lower surface 3402*a* of the tray 340*a*.

Embodiment 3

Figure 20:
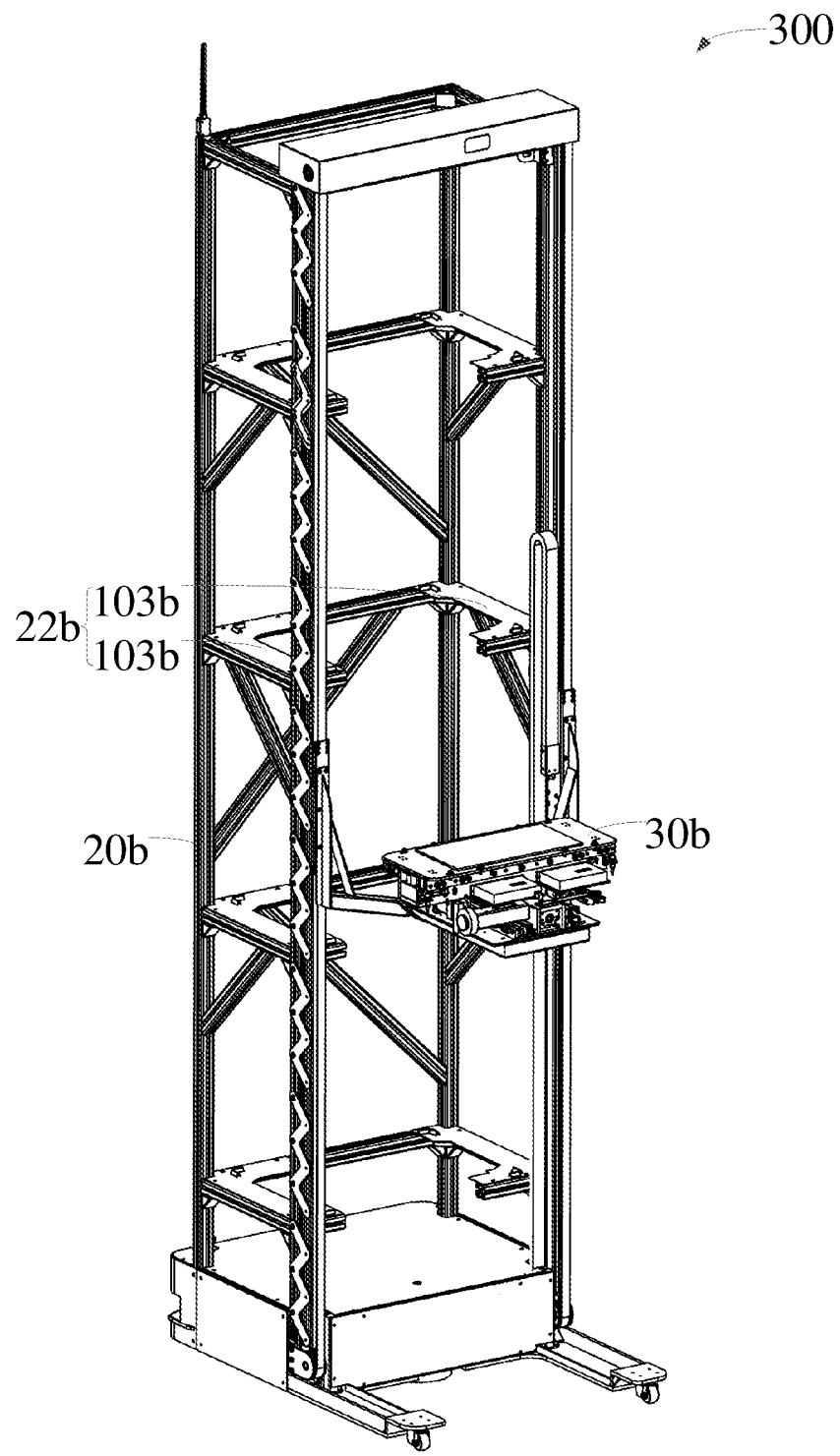
FIG. 20 is a three-dimensional view of a transport robot according to Embodiment 3 of this application.

Referring to FIG. 20, Embodiment 3 of this application provides a transport robot 300, which is basically the same as the transport robot 200 of Embodiment 2, except that any one of a plurality of partitions 22*b* includes two supporting points 103*b*, and the rotary mechanism is replaced with a moving mechanism 36*b*.

The two supporting points 103*b* are together configured to hold goods, and a distance between the two supporting points 103*b* is configured to allow a tray 340*b* to pass through during lifting. The supporting point 103*b* is presented in the form of a supporting plate. In some other embodiments, the two supporting point 103*b* may alternatively be a supporting column or a supporting block. The two supporting plates may be independent of each other, or may be connected to form a U-shaped plate, and a notch of the U-shaped plate can allow the tray 340*b* to pass through during lifting.

It can be understood that the multi-layer rack 20*b* in this embodiment is interchangeable with that of Embodiment 2.

Figure 21:
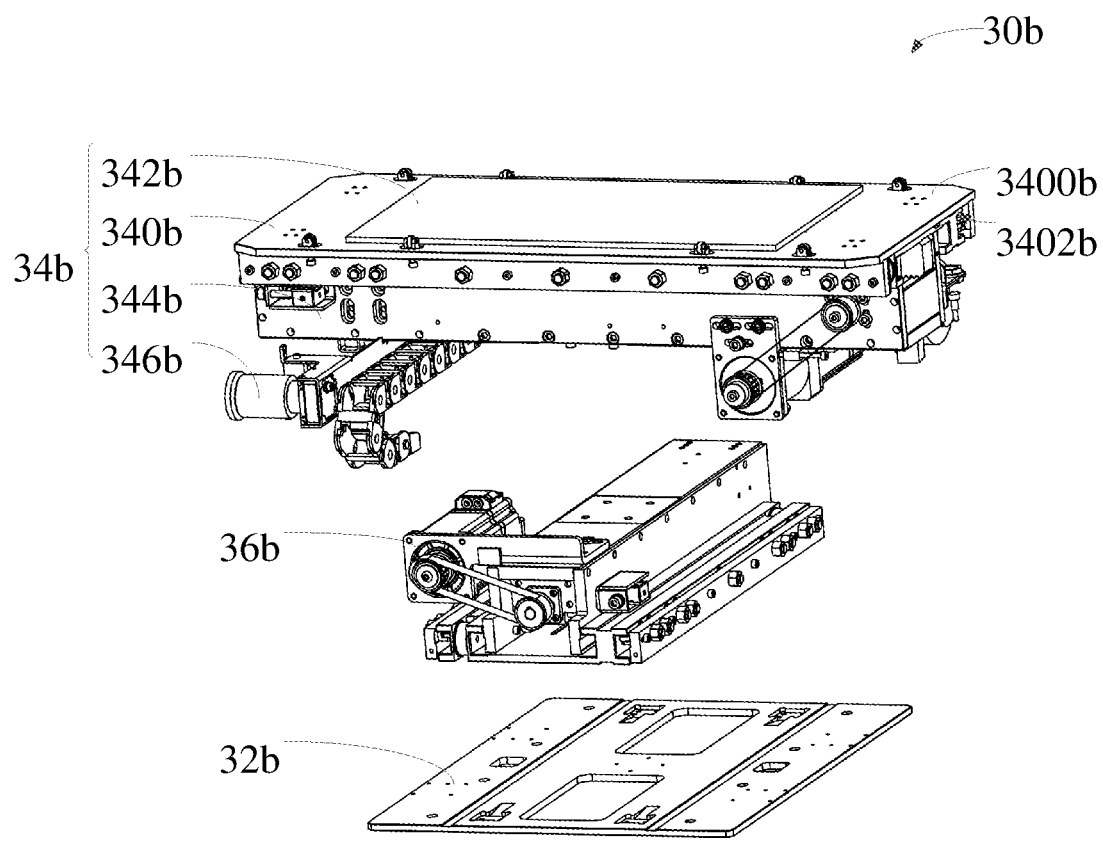
FIG. 21 is a schematic exploded view of a carrying device of the transport robot shown in FIG. 20.
Figure 22:
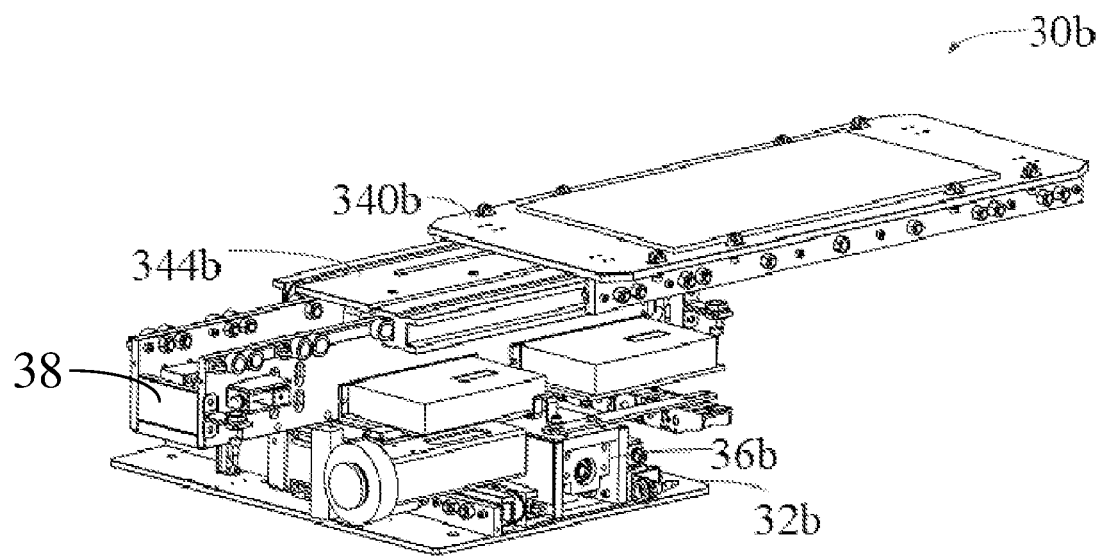
FIG. 22 is a three-dimensional view of a carrying device of the transport robot shown in FIG. 20, where a telescopic arm has extended.
Figure 23:
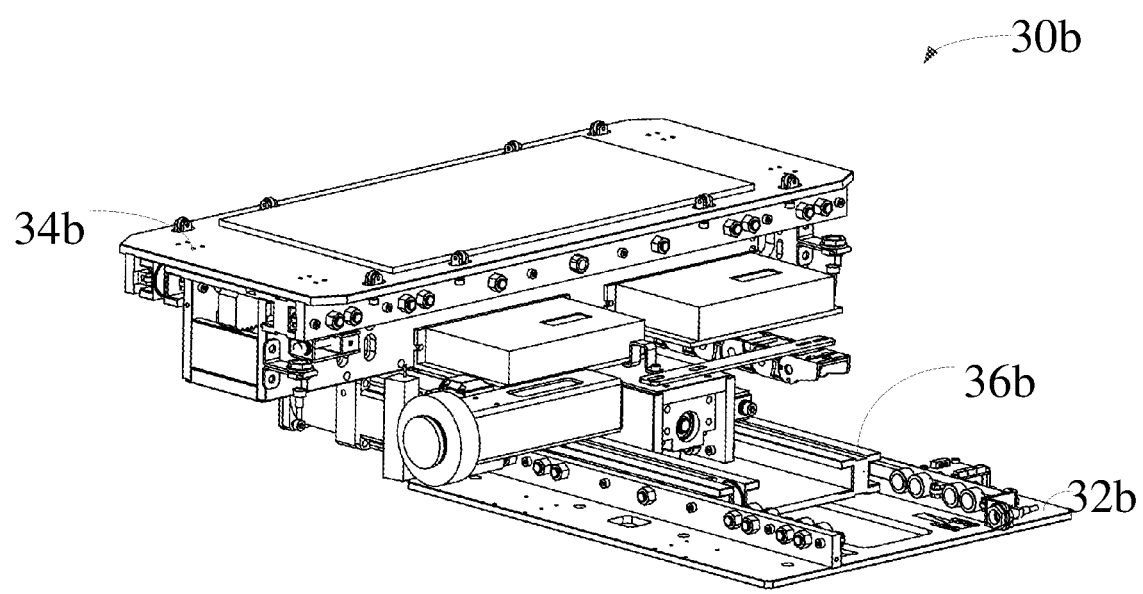
FIG. 23 is a three-dimensional view of a carrying device of the transport robot shown in FIG. 20, where a moving mechanism drives a fork to move.

Referring to FIG. 21 to FIG. 23, the carrying device 30*b* includes a bracket 32*b*, a fork 34*b*, and a moving mechanism 36*b*.

The fork 34*b* includes a base 38 mounted on the bracket 32*b*, the moving mechanism 36*b* is configured to drive the fork 34*b* to move in a direction parallel to the tray 340*b* relative to the bracket 32*b*, and a moving direction of the fork 34*b* is perpendicular to an extending direction of a telescopic arm 344*b*. The moving mechanism 36*b* is powered by a motor, and the power is transmitted by a pulley mechanism. According to actual situations, the pulley mechanism may alternatively be replaced with a rack and pinion mechanism, a screw mechanism, or the like. Because the fork 34*b* is driven to move relative to the bracket 32*b* in a moving manner, the multi-layer rack 20*b* is located on a moving track of the fork 34*b*. Therefore, the fork 34*b* does not need to be aligned with the multi-layer rack 20*b*.

When the fork 34*b* is aligned with the warehouse shelving unit, the fork 34*b* moves in a direction away from the multi-layer rack 20*b* until the fork 34*b* is aligned with the warehouse shelving unit.

The manner in which the fork 34*b* carries the goods on the multi-layer rack 20*b* is further described herein as follows:

The fork 34*b* cooperates with the lifting mechanism to carry the goods to the multi-layer rack 20*b*. Specifically, the carrying device 30*b* is raised, so that the tray 340*b* is higher than the two supporting points 103*b*. Then, the fork 34*b* moves in a direction close to the multi-layer rack 20*b*, so that the tray 340*b* is located right above the two supporting points 103*b*. Then, the carrying device 30*b* is lowered, to bring the goods into contact with the two supporting points 103*b*. Then, the carrying device 30*b* continues to be lowered, to separate the goods from the tray 340*b*. In this case, the goods are placed on the two supporting points 103*b*, the tray 340*b* is located right below the two supporting points 103*b*, and then the fork 34*b* is reset.

The fork 34*b* cooperates with the lifting mechanism to carry the goods out of the multi-layer rack 20*b*. Specifically, the carrying device 30*b* is lowered, so that the tray 340*b* is lower than the two supporting points 103*b*. Then, the fork 34*b* moves in a direction close to the multi-layer rack 20*b*, so that the tray 340*b* is located right below the two supporting points 103*b*. Then, the carrying device 30*b* is raised, to bring the goods into contact with the tray 340*b*. Then, the carrying device 30*b* continues to be raised, to separate the goods from the two supporting points 103*b*. In this case, the goods are placed on the tray 340*b*, the tray 340*b* is located right above the two supporting points 103*b*, and the goods are reset with the fork 34*b*.

The structure of the warehouse shelving unit is similar to the structure of the multi-layer rack 20*b*. The fork 34*b* cooperates with the lifting mechanism to carry the goods to the warehouse shelving unit. Specifically, the carrying device 30*b* is raised, so that the tray 340*b* is higher than the two supporting points 103*b*. Then, the tray 340*b* extends with the telescopic arm 344*b*, so that the tray 340*b* is located right above the two supporting points 103*b*. Then, the carrying device 30*b* is lowered, to bring the goods into contact with the two supporting points 103*b*. Then, the carrying device 30*b* continues to be lowered, to separate the goods from the tray 340*b*. In this case, the goods are placed on the two supporting points 103*b*, the tray 340*b* is located right below the two supporting points 103*b*, and the tray 340*b* is retracted with the telescopic arm 344*b*.

The fork 34*b* cooperates with the lifting mechanism to carry the goods out of the warehouse shelving unit. Specifically, the carrying device 30*b* is lowered, so that the tray 340*b* is lower than the two supporting points 103*b*. Then, the tray 340*b* extends with the telescopic arm 344*b*, so that the tray 340*b* is located right below the two supporting points 103*b*. Then, the carrying device 30*b* is raised, to bring the goods into contact with the tray 340*b*. Then, the carrying device 30*b* continues to be raised, to separate the goods from the two supporting points 103*b*. In this case, the goods are placed on the tray 340*b*, the tray 340*b* is located right above the two supporting points 103*b*, and the goods and the tray 340*b* are retracted with the telescopic arm 344*b*.

An image detection device 346*b* is configured to obtain image information of the goods or the warehouse shelving unit. The image detection device 346*b* may be a camera configured to scan an identification code attached to the goods or the warehouse shelving unit, then obtain information about the goods, including a type, a shelf life and the like of the goods according to information provided by the identification code of the goods, or determine whether the carrying device 30*b* is at the same height as one layer of the goods to be carried on the warehouse shelving unit according to the identification code on the warehouse shelving unit, and determine whether the fork 34*b* is aligned with the warehouse shelving unit according to the identification code on the goods. The image detection device 346*b* is fixedly mounted, and does not extend with the telescopic arm 344*b*.

Compared with the prior art, in the carrying devices 30, 30*a*, and 30*b*, and the transport robots 100, 200, and 300 having the carrying devices 30, 30*a*, and 30*b* provided in the embodiments of this application, by the detection device is mounted on the tray, and the detection device detects the goods placed on the tray, avoiding the manual detection of the goods, and providing higher efficiency.

Finally, it should be noted that the foregoing embodiments are merely used for describing the technical solutions of this application, but are not intended to limit this application. Under the ideas of this application, the technical features in the foregoing embodiments or different embodiments may also be combined, the steps may be performed in any order, and many other changes of different aspects of this application also exist as described above. These changes are not provided in detail for simplicity. Although this application is described in detail with reference to the foregoing embodiments, a person of ordinary skill in the art should understand that modifications can be made to the technical solutions described in the foregoing embodiments, or equivalent replacements can be made to some technical features in the technical solutions, and these modifications or replacements will not cause the essence of corresponding technical solutions to depart from the scope of the technical solutions in the embodiments of this application.

What is claimed is:

1. A carrying device, comprising:
   a bracket;
   a tray, mounted on the bracket, and configured to hold goods;
   a detection device, connected to the tray, and configured to detect the goods placed on the tray; and
   a telescopic arm, mounted on the bracket, and extensible in a direction parallel to the tray, to move the goods placed on the tray;
   wherein the detection device is arranged on a side of the tray for holding the goods;
   wherein the tray is mounted on the telescopic arm; and when the telescopic arm extends, the tray extends with the telescopic arm;
   wherein the carrying device further comprises a fork and a moving mechanism;
   the fork comprises the bracket, the detection device, and the telescopic arm; and
   the fork is mounted on the bracket, the moving mechanism is configured to drive the fork to move in the direction parallel to the tray, and a moving direction of the fork is perpendicular to an extending direction of the telescopic arm.

2. The carrying device according to claim 1, wherein the carrying device further comprises a fork and a rotary mechanism;
   the fork comprises the tray, the detection device and the telescopic arm; and
   the fork is mounted on the bracket, and the rotary mechanism is configured to drive the fork to rotate around an axis perpendicular to the tray.

3. The carrying device according to claim 1, wherein the carrying device further comprises an image detection device; and
   the image detection device is configured to obtain image information of the goods.

4. The carrying device according to claim 3, wherein the tray comprises an upper surface and a lower surface opposite to each other; and
the upper surface of the tray is configured to hold the goods, and the image detection device is mounted on the lower surface of the tray.

5. The carrying device according to claim 1, wherein the detection device is a weight detection device configured to detect weight of the goods placed on the tray.

6. The carrying device according to claim 5, wherein the detection device is sheet-Ike and parallel to the tray.

7. The carrying device according to claim 1, wherein the detection device is a radio frequency identification device configured to detect radio frequency identification tags on the goods placed on the tray, to detect the goods placed on the tray.

8. A transport robot, comprising the carrying device according to claim 1.

9. The transport robot according to claim 8, further comprising a lifting mechanism configured to drive the carrying device to be raised and lowered.

10. The transport robot according to claim 9, further comprising a multi-layer rack, wherein any layer of the multi-layer rack is configured to hold the goods.

11. A carrying device, comprising:
    a bracket;
    a fork, arranged on the bracket and capable of extending relative to the bracket in a first direction; wherein the fork comprises:
        a base connected to the bracket, wherein the base is capable of extending relative to the bracket in the first direction;
        a telescopic arm, mounted on the bracket, wherein the telescopic arm is capable of extending relative to the base in a second direction;
        a tray, mounted on the telescopic arm, wherein the tray is configured to hold goods, and is capable of extending relative to the telescopic arm in the second direction; and
        a detection device, connected to the tray, and configured to detect the goods placed on the tray; and
    a moving mechanism connected to the bracket, wherein the moving mechanism is configured to drive the fork to move in the first direction;
    wherein both the first direction and the second direction are parallel to the tray, and the first direction is perpendicular to the second direction.

12. The carrying device according to claim 11, further comprising an image detection device; wherein the image detection device is configured to obtain image information of the goods.

13. The carrying device according to claim 11, wherein the detection device is a weight detection device configured to detect weight of the goods placed on the tray.

14. The carrying device according to claim 11, wherein the detection device is sheet-like and parallel to the tray.

15. The carrying device according to claim 11, wherein the tray comprises an upper surface configured to hold goods and a lower surface opposite to the upper surface, the detection device is arranged on the upper surface.

* * * * *